(12) United States Patent
Yildirim et al.

(10) Patent No.: US 10,288,211 B2
(45) Date of Patent: May 14, 2019

(54) TRANSPORT SYSTEM FOR MOTOR VEHICLE ENGINES

(71) Applicant: TKR Spezialwerkzeuge GmbH, Gevelsberg (DE)

(72) Inventors: Fatih Yildirim, Munich (DE); Ralf Rachholz, Finsing (DE)

(73) Assignee: TKR Spezialwerkzeuge GmbH, Gevelsberg (DE)

( * ) Notice: Subject to any disclaimer, the term of this patent is extended or adjusted under 35 U.S.C. 154(b) by 0 days.

(21) Appl. No.: 15/242,361

(22) Filed: Aug. 19, 2016

(65) Prior Publication Data
US 2017/0059081 A1 Mar. 2, 2017

(30) Foreign Application Priority Data

Aug. 24, 2015 (DE) .................. 10 2015 114 031

(51) Int. Cl.
| | |
|---|---|
| *B25H 5/00* | (2006.01) |
| *B25H 1/00* | (2006.01) |
| *F16M 1/04* | (2006.01) |
| *F16M 3/00* | (2006.01) |
| *F01D 25/28* | (2006.01) |
| *B64F 5/50* | (2017.01) |
| *F16M 11/00* | (2006.01) |

(52) U.S. Cl.
CPC .............. *F16M 1/04* (2013.01); *B25H 5/00* (2013.01); *B64F 5/50* (2017.01); *F01D 25/28* (2013.01); *F05D 2260/02* (2013.01); *F16M 3/00* (2013.01); *F16M 11/00* (2013.01)

(58) Field of Classification Search
CPC . F16M 1/04; F16M 3/00; F16M 11/00; B25H 5/00; B25H 1/00; F01D 25/28; B64F 5/50; F05D 2260/02

USPC ....... 248/544, 637, 671, 673, 676, 677, 127, 248/166, 554, 555; 269/55, 86, 216, 269/254 R, 17, 47; 410/44, 47, 49, 529,
(Continued)

(56) References Cited

U.S. PATENT DOCUMENTS 2,851,235 A * 9/1958 Henig ........................ F41A 9/87
280/79.6
4,431,223 A 2/1984 Miller
(Continued)

FOREIGN PATENT DOCUMENTS

| | | |
|---|---|---|
| CA | 2038048 A1 | 10/1991 |
| DE | 30 05 310 A1 | 7/1981 |

(Continued)

OTHER PUBLICATIONS

European Office Action dated Feb. 1, 2017 in European counterpart application No. 16185071.4 (8 pages) (German only).
(Continued)

*Primary Examiner* — Tan Le
(74) *Attorney, Agent, or Firm* — Nixon Peabody LLP

(57) ABSTRACT

The invention relates to a transport system for motor vehicle engines, with an engine unit arrangeable on a motor vehicle engine and a load pickup unit arrangeable on a load carrier. In order to provide a transport system that ensures reliable positional securing of a motor vehicle engine connected with the transport system, it is provided that a locking unit adjustable between a locked position and an unlocked position is arranged on the load pickup unit, which is designed such that it automatically locks the engine unit in a transport position on the load pickup unit.

15 Claims, 4 Drawing Sheets

Figure 1:
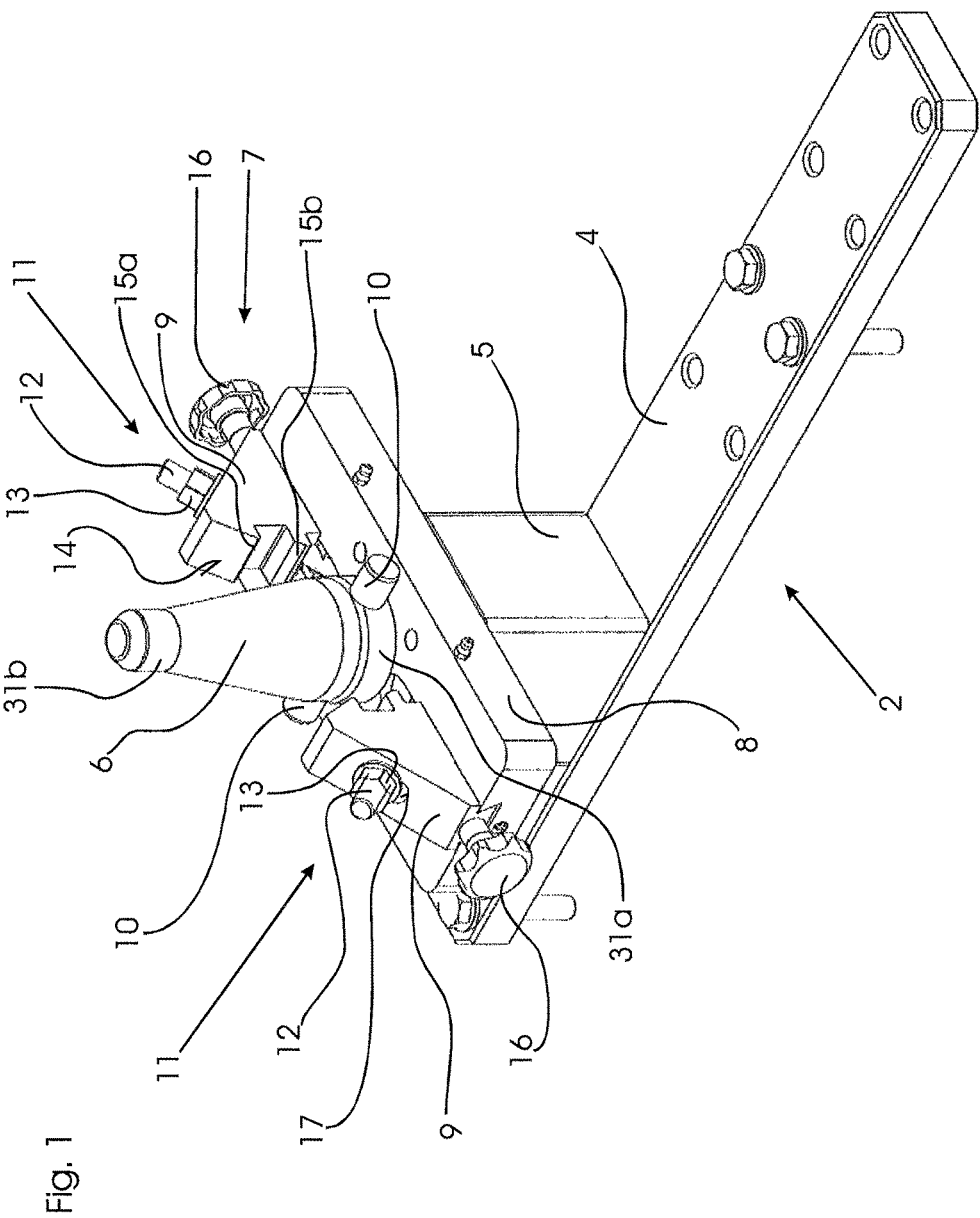

(58) Field of Classification Search
USPC ........... 410/589; 187/44; 244/137.1; 280/30; 414/389, 391
See application file for complete search history.

(56) References Cited

U.S. PATENT DOCUMENTS

| | | | |
|---|---|---|---|
| 4,440,265 A * | 4/1984 | Spagnoli | B64F 5/50 |
| | | | 182/129 |
| 4,588,165 A | 5/1986 | Stellato et al. | |
| 5,044,846 A * | 9/1991 | Richardson | B60P 7/12 |
| | | | 376/272 |
| 5,644,992 A * | 7/1997 | Clive-Smith | B65D 88/129 |
| | | | 108/53.1 |
| 5,934,490 A | 8/1999 | Mora | |
| 9,714,585 B2 * | 7/2017 | Morey | B62B 3/02 |
| 9,802,525 B2 * | 10/2017 | Gill, III | B60P 3/00 |
| 2014/0259663 A1 | 9/2014 | Scelsi et al. | |

FOREIGN PATENT DOCUMENTS

| | | |
|---|---|---|
| DE | 40 13 228 C1 | 6/1991 |
| DE | 101 46 057 A1 | 4/2003 |
| DE | 10 2005 030 734 A1 | 1/2007 |
| DE | 10 2010 005 829 A1 | 7/2011 |

OTHER PUBLICATIONS

German Office Action dated Nov. 8, 2017 in German counterpart application No. 102015114031.4 (10 pages) (German only).

* cited by examiner

TRANSPORT SYSTEM FOR MOTOR VEHICLE ENGINES

BACKGROUND OF THE INVENTION

Field of the Invention

The invention relates to a transport system for motor vehicle engines with
an engine unit arrangeable on a motor vehicle engine and
a load pickup unit arrangeable on a load carrier.

Description of Related Art

A replacement of a motor vehicle engine required within the framework of repair work in motor vehicle repair shops requires that the repair shop be provided with suitable devices for this, which enable a positionally secure arrangement of the motor vehicle engine on, for example, a load carrier designed as a mounting trestle. The mounting trestle is thereby generally moveable and thus enables the relocation and positioning of an engine to be replaced or respectively already replaced.

Due to the heavy empty weight of motor vehicle engines, it is thus very important that a reliable arrangement of the motor vehicle engine on a transport system connectable for example with a mounting trestle is ensured. Moreover, the transport system must generally be designed to also ensure a secure arrangement in the case of pivoting movements of the mounting trestle, in the frame of which the engine is rotated around a longitudinal axis.

Known transport systems of the initially named type generally provide for the arrangement of large engine units on the motor vehicle engine, which have a heavy empty weight. A corresponding engine unit is also required for each different engine. Moreover, the known transport systems generally provide no options for pivoting the engines, since the positioning security of the motor vehicle engine on the transport system or respectively on the load carrier having the transport system is not ensured.

BRIEF SUMMARY OF THE INVENTION

The object of the invention is to provide a transport system, which ensures reliable positional securing of a motor vehicle engine connected with the transport system.

The invention solves the object through a transport system with the characteristics of claim 1. Advantageous further embodiments of the invention are specified in the dependent claims.

Characteristic of the transport system according to the invention is that a locking unit adjustable between a locked and an unlocked position is arranged on the load pickup unit—which is arrangeable in the repair shop, for example, on a moveable mounting trestle or the like. According to the invention, the locking unit is thereby designed such that the engine unit arrangeable on a motor vehicle engine automatically locks in a transport position on the load pickup unit.

The transport position is thereby the position of the engine unit relative to the load pickup unit, in which the motor vehicle engine is arranged by means of the engine unit in a positionally secure manner on the load pickup unit and is then relocated safely with the transport system and can also be pivoted if necessary so that it is adjustable into the respectively desired position. In the transport position, the motor vehicle engine is thus fixed without further aids alone via the load pickup unit. A reliable positional securing is thereby of particular importance in particular against the background of the considerable weight of the motor vehicle engines, since a falling engine in the repair shop can lead to considerable injury to nearby employees.

The use of a locking unit, which enables a removal of the engine unit from the load pickup unit in the unlocked position and which automatically goes to the locked position, ensures to a great degree that an engine arranged using the transport system remains reliably in the transport position. A supplementary positional securing of the engine unit on the load pickup unit and/or a locking of the locking unit is not required according to the invention. Using the transport system, any load carrier can thus be used for the reliable relocation of motor vehicle engines as long as the load carriers, such as e.g. bearing supports, are designed for picking up the loads applied by the motor vehicle engines.

The design of the engine unit and the load pickup unit, such that in the transport position all occurring forces are reliably transferred to the load pickup unit by the engine unit, is generally freely selectable. However, according to an advantageous embodiment of the invention, it is provided that the load pickup unit has a pickup body and the engine unit has a pickup opening adjusted on the pickup body such that the engine unit is fixed in the transport position mainly perpendicular to the longitudinal axis of the pickup body on the load pickup unit.

According to this embodiment of the invention, a pickup body, e.g. a pickup mandrel, is provided on the load pickup unit, which engages in the transport position into a pickup opening on the engine unit. In the transport position, the pickup opening and the pickup body thereby work together such that a relocation of the engine unit directed perpendicular to the pickup body, e.g. a pickup mandrel, is mainly blocked. A corresponding design of the load pickup unit and the engine unit ensures in a simple manner a corresponding positional securing of a motor vehicle engine arrangeable on the engine unit relative to the load carrier connected with the load pickup unit. Furthermore, this embodiment of the invention also ensures, in the case of a support of the engine unit provided particularly advantageously in the transport position with a front surface on a stop surface of the load pickup unit, that a movement of the engine unit directed accordingly in the direction of the longitudinal axis of the pickup body in the direction towards the load pickup movement is blocked in a simple manner. Additional securing measures for the corresponding positional securing can be omitted according to this embodiment of the invention.

The design of the pickup body as well as the corresponding design of the pickup section can generally take place in any manner. However, according to a particularly advantageous embodiment of the invention, it is provided that the pickup opening and the pickup body have two correspondingly designed cylinder sections arranged at a distance from each other in the longitudinal direction of the pickup body. The use of two defined cylinder sections makes it possible to design the surfaces provided for positional securing in a simple manner. A relocation securing is thereby achieved in a particularly reliable manner perpendicular to the longitudinal axis of the pickup body via the cylinder surfaces. The other areas of the pickup body can thereby be designed with a lower tolerance since they do not need to contribute to the load transfer.

According to a particularly advantageous embodiment of the invention, it is thereby provided that the cylinder sections are interconnected via a conical connection section, wherein the cylinder section facing the engine unit has a smaller diameter than the cylinder section facing away from the engine unit. According to this embodiment of the invention, the pickup body has a conical progression tapering in the direction towards the engine unit, wherein the cylinder sections arranged at a distance from each other have a different diameter. The conical progression thereby makes it possible in a supplementary manner to achieve a particularly simple and reliable arrangement of the engine unit on the pickup unit. The conical progression of the pickup opening designed according to the pickup body thereby also serves as an insertion and centering aid.

According to a further embodiment of the invention, it is further provided that the load pickup unit and the engine unit are fixed against each other in the transport position via an anti-twist device. A correspondingly designed anti-twist device ensures that the engine unit and in particular a motor vehicle engine connected with the engine unit is not twisted with respect to the load pickup unit in the case of a tilt of the motor vehicle engine on the load carrier. The anti-twist device thus enables an exact positioning of the motor vehicle engine connected with the engine unit so that a simple replacement, i.e. installation and removal of motor vehicle engines can take place in the repair shop. The design of the anti-twist device can thereby take place in any manner, for example, through pins and/or bolts protruding from the pickup body, which engage in the transport position in corresponding recesses on the engine unit.

The locking unit provided according to the invention ensures based on its self-activation that an engine unit arranged in the transport position is automatically fixed on the load pickup unit. Supplementary securing means for the positional securing of the transport position can thus be omitted, whereby operating errors in the repair shop that can lead to accidents, inasmuch as supplementary securing measures are required, can be prevented.

The design of the locking unit is thereby generally freely selectable. It is provided according to an advantageous embodiment of the invention that the locking unit has a locking element, preferably two locking elements pretensioned, in particular spring-pretensioned, in the direction towards the locked position.

The use of one or more locking elements, which are pretensioned in the direction towards the locked position, ensures to a high degree an automatic locking of the transport position. In particular, a spring-pretensioning is characterized in that it permits, for one, a relocation from the locked position into the unlocked position in the case of the arrangement of the engine unit on the load pickup unit, but that the locking unit simultaneously moves in an automatic and reliable manner into the locked position when the transport position is reached. A spring pretensioning is thereby also characterized by its special simplicity and reliability as well as low production costs.

The automatic locking according to the invention generally suffices in order to ensure that the engine unit in the transport position is positionally secured in a reliable manner on the load pickup unit. It is provided according to an advantageous further embodiment of the invention that the locking elements have play compensation means.

These advantageously provided play compensation means are apparatuses, which make it possible to compensate for a potential play present in the locked position between the engine unit and the load pickup unit. A corresponding play compensation increases the accuracy of the positioning of a motor vehicle engine connected with the engine unit and can also be used in a supplementary manner for positionally securing the engine unit on the load pickup unit. The design of the play compensation means can thereby take place in any manner. This can be realized, for example, through adjustable wedge elements or the like. However, it can be provided according to a particularly advantageous embodiment of the invention that the play compensation means has a threaded bolt, which extends through a through hole of the locking elements, which has an elongated cross-section, wherein the threaded bolt is fixed on the load pickup means. According to this design of the invention, a threaded bolt extends through the locking element. The arrangement of the threaded bolt in the through hole with an elongated cross-section, e.g. like an elongated hole, thereby simultaneously ensures the relocatability of the locking element between the unlocked position and the locked position. Any potential play can be compensated for in a simple manner via a securing nut that can be screwed onto the free end of the threaded bolt. Moreover, positional securing can hereby be achieved in a supplementary manner even though the embodiment according to the invention generally already ensures reliable positional securing.

The design of the locking elements such that they can reliably lock the engine unit in the transport position can be freely selected. However, it can be provided according to a particularly advantageous embodiment of the invention that the locking elements have two detent projections arranged at a distance from each other, which in the transport position of the engine unit are located in engagement with correspondingly designed detent bodies on the engine unit. According to this embodiment of the invention, the detent projections engage behind—when observed in the lifting direction of the engine unit from the load pickup unit—the detent bodies arranged on the locking elements on the engine unit. The detent bodies can thereby be designed for example as circumferential flanges, which work together with corresponding detent projections on the locking elements.

It is thereby provided according to a particularly advantageous embodiment of the invention that the locking elements have an infeed plane. The arrangement of an infeed plane ensures in the case of the arrangement of the engine unit on the receiver, i.e. in the case of the placement of the engine unit on the pickup unit, that the engine unit displaces the locking elements out of the locked position into the unlocked position during the relocation into the transport position. After reaching the transport position, the engine unit then disengages from the infeed plane and the locking elements automatically move, preferably pretensioned, in particular spring-pretensioned, into the locked position and lock the engine unit there.

The configuration of the relocatability of the locking elements on the load pickup unit is thereby generally freely selectable. It is provided according to a particularly advantageous embodiment of the invention that the locking elements are displaceably mounted in a guide, in particular of a dovetail guide on the load pickup. The use of a suitable guide, in particular dovetail guide, thereby also ensures a reliable transfer of forces directed in the direction of the longitudinal axis of the pickup body. These are reliably transferred to the load pickup unit via the locking element and the dovetail guide.

BRIEF DESCRIPTION OF THE SEVERAL VIEWS OF THE DRAWING(S)

Figure 2:
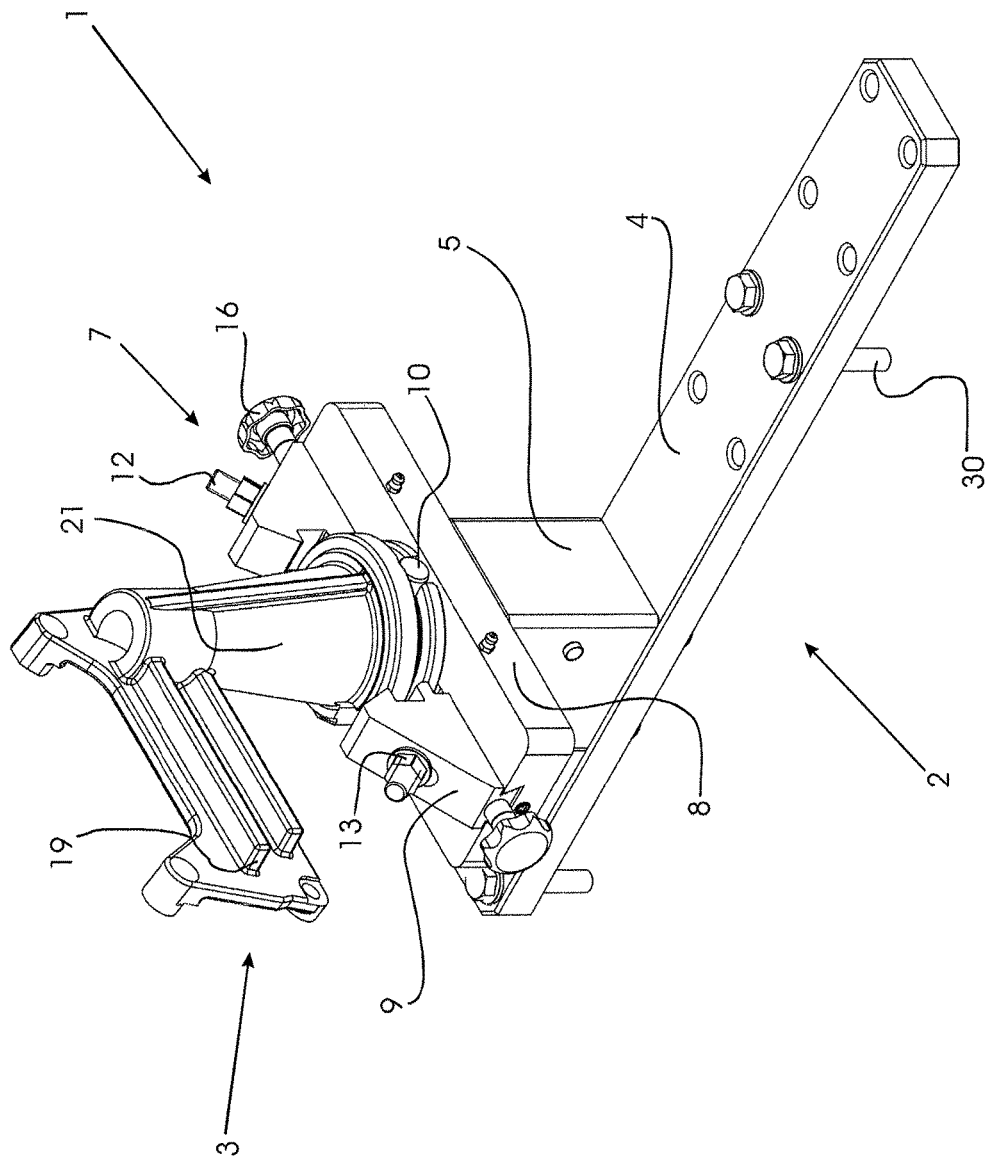
Figure 3:
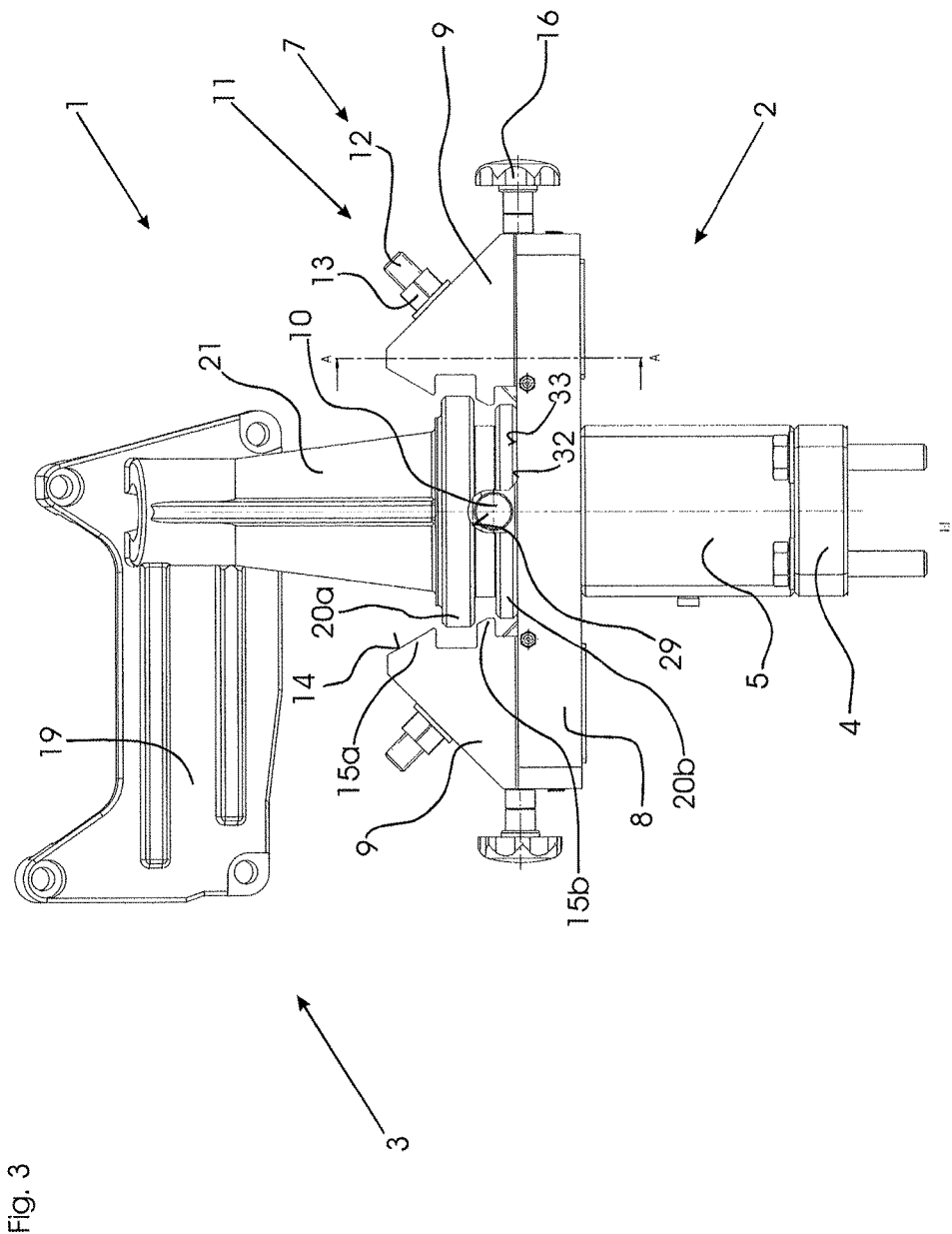
Figure 4:
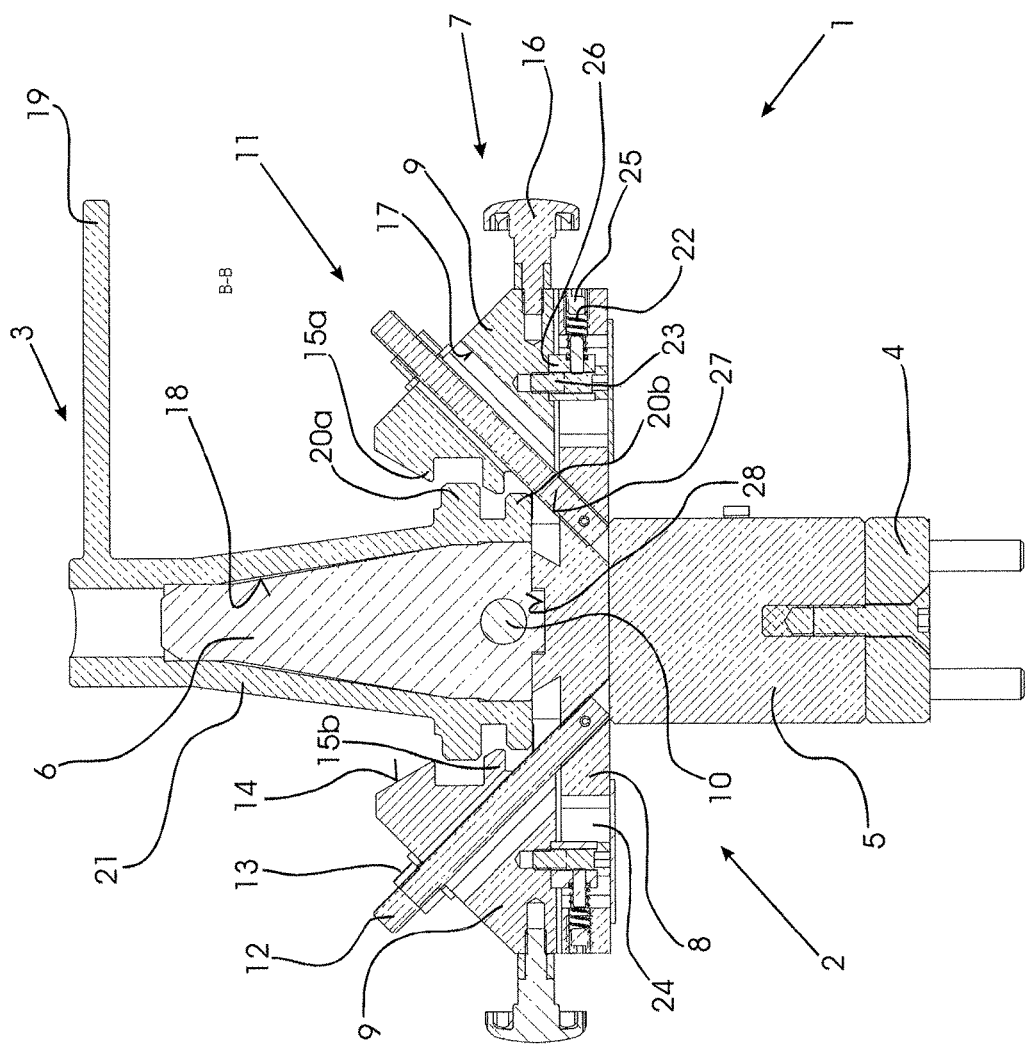

An exemplary embodiment of the invention is explained below with reference to the drawings. The drawings show in:

FIG. 1 an exemplary embodiment of a load pickup unit of a transport system in a perspective view;

FIG. 2 the load pickup unit from FIG. 2 with an engine unit arranged on it in a transport position in a perspective view;

FIG. 3 a front view of the transport system from FIG. 1 in the transport position shown in FIG. 1 and FIG. 4 a view of a cross-section of the transport system from FIG. 1 in the transport position shown in FIG. 1.

DETAILED DESCRIPTION OF THE INVENTION

A transport system 1 shown in FIGS. 1 to 4 for picking up motor vehicle engines (not shown here) has a load pickup unit 2, which can be arranged on a load carrier (not shown here), as well as an engine unit 3 arrangeable on the motor vehicle engine to be transported.

The load pickup unit 2 shown in FIG. 1 without an engine unit 3 thereby has a base carrier 4, which can be fastened on a load carrier (not shown here), e.g. a moveable mounting trestle, by means of suitable screws 30, which extend through openings in the base carrier 4. The mounting trestle thereby normally offers the option of adjusting the position of the load pickup unit 2, i.e. to both lift and lower it and to turn it about an axis of rotation parallel to the longitudinal axis of the base carrier 4 so that an engine arranged on the transport system 1 can be optimally aligned. A base plate 8, which serves to receive a pickup body 6 as well as two locking elements 9, by means of which the engine unit 3 can be fastened in a positionally secure manner on the load pickup unit 2, is thereby fastened on the base carrier 4 via a spacer block 5

For this, the pickup body 6 has two cylinder sections 31a, 31b arranged at a distance from each other in the direction of the longitudinal axis of the pickup body 6, wherein the cylinder section 31b has a smaller cross-section than the cylinder section 31a so that they are interconnected via a conical connection section. A bolt 10, which serves as an anti-twist device, is arranged on each opposite-lying section of the cylinder section 31a. In the transport position of the engine carrier 3 shown in FIGS. 2 to 4, a pickup section 21 of the engine unit 3 with a pickup opening 18 designed corresponding to the pickup body 6 is arranged on the pickup body 6 such that the engine unit 3 with a lower stop surface 32 rests on a support plane 33 of the base plate 8. The cylinder sections 31a and 31b are arranged in the transport position in corresponding sections in the pickup opening 18 of the engine unit 3 and thus ensure a positional securing of the engine unit 3 perpendicular to the longitudinal axis of the pickup body 6. The spacer bolts 10 are arranged in the transport position on the pickup section 21 in correspondingly designed recesses 29 and thus form an anti-twist device of the engine unit 3 with respect to the load pickup unit 2. The transport position is thereby the position of the transport system 1, at which the engine unit 3 is fixed on the load pickup unit 2 so that the engine can be relocated in the desired manner.

For positionally securing the engine unit 3 on the load pickup unit 2 in the transport position, the load pickup unit 2 thereby has a locking unit 7 arranged on the base plate 8. The locking unit 7 has two locking elements 9 displaceably mounted in dovetail guides on the base plate 8. The locking elements 9 are thereby pretensioned out of the unlocked position shown in the FIGS. 2 to 4 in the direction towards a locked position, wherein in the locked position detent projections 15a, 15b are located in engagement with correspondingly designed detent bodies 20a, 20b on the locking elements 9 on the pickup section 21 of the engine unit 3 so that the engine unit 3 is secured from being lifted by the load pickup 2 in the direction of the longitudinal axis of the pickup body 6. A force acting in the direction of the longitudinal axis is also reliably transferred from the engine unit 3 to the load pickup unit 2 via the dovetail guide.

The spring pretensioning of the locking elements 9 that can be moved towards each other and away from each other is thereby respectively brought about by a spring element 22, which rests, on one end, on an Allen head screw 25 that can be screwed into the base plate 8 and, on the other end, on a stud 23, which extends through a groove 26 on the base plate 8 and is fastened in the locking element 9. A displacement of the locking element 9 thus leads to an adjustment of the stud 23 in an opening 24 on the base plate 8, wherein the spring element 22 effectuates a pretensioning of the locking elements 9 in the direction towards the locked position.

For play compensation in the locked position, the load pickup unit 2 also has on each locking element 9 a threaded bolt 12 extending through a through hole 17 of the locking elements 9, which are screwed into a threaded hole 27 on the base plate 8. The through hole 17 has in cross-section an elongated shape like an elongated hole so that it is ensured that the locking element 9 can be adjusted between the unlocked position and the locked position. The locking element 9 for play compensation in the locked position can thereby be locked additionally to the pretensioning applied by the spring force via a securing nut 13 that can be screwed onto the threaded bolt 12.

The pickup body 6 is arranged in a recess 28 on the base plate 8 via a corresponding pin. A fastening of the engine unit 3 on a motor vehicle engine (not shown here) takes place via a correspondingly designed connection flange 19. For adjusting the locking elements, they have handles 16, which are screwed into the locking elements 9.

LIST OF REFERENCE NUMBERS

1 Transport system
2 Load pickup unit
3 Engine unit
4 Base carrier
5 Spacer block
6 Pickup body
7 Locking unit
8 Base plate
9 Locking elements
10 Anti-twist device (bolt)
11 Securing means
12 Threaded bolt
13 Securing nut
14 Infeed plane
15a, 15b Detent projections
16 Handle
17 Through hole
18 Pickup opening
19 Connection flange
20a, 20b Detent bodies
21 Pickup section
22 Spring element
23 Stud
24 Opening
25 Allen head screw
26 Groove
27 Threaded hole
28 Depression
29 Recess
30 Screws 31a, 31b Cylinder section
32 Stop surface
33 Support plane

We claim:

1. A transport system for motor vehicle engines, with
an engine unit arrangeable on a motor vehicle engine to be transported and
a load pickup unit arrangeable on a load carrier,
wherein
a locking unit adjustable between a locked position and an unlocked position is arranged on the load pickup unit, which is designed such that it automatically locks the engine unit in response to a motor vehicle engine being arranged on the load pickup unit in a transport position;
wherein the locking unit has at least one locking elements pretensioned, in a direction towards the locked position, and
wherein the at least one locking elements have two detent projections arranged at a distance from each other, which are located in engagement with correspondingly designed detent bodies on the engine unit in the transport position of the engine unit.

2. The transport system according to claim 1, wherein the load pickup unit has a pickup body and the engine unit has a pickup opening adjusted to the pickup body such that the engine unit in the transport position is fixed mainly perpendicular to a longitudinal axis of the pickup body on the load pickup unit.

3. The transport system according to claim 2, wherein the pickup opening and the pickup body have two correspondingly designed cylinder sections arranged at a distance from each other in a direction of the longitudinal axis of the pickup body.

4. The transport system according to claim 1, wherein the load pickup unit and the engine unit are fixed against each other in the transport position via an anti-twist device.

5. The transport system according to claim 3, wherein the cylinder sections are interconnected via a conical connection section, wherein the cylinder section facing the engine unit has a smaller diameter than the cylinder section facing away from the engine unit.

6. The transport system according to claim 1, wherein the at least one locking elements have play compensation means.

7. The transport system according to claim 6, wherein the play compensation means has a threaded bolt extending through a through hole of the at least one locking elements having an elongated cross-section and fixed on the load pickup unit.

8. The transport system according to claim 1, wherein the at least one locking element has an infeed plane.

9. The transport system according to claim 1, wherein the at least one locking elements are displaceably mounted in a guide on the load pickup unit.

10. The transport system according to claim 1, wherein the load pickup unit has a pickup body and the engine unit has a pickup opening and wherein the pickup opening and the pickup body have two correspondingly designed cylinder sections arranged at a distance from each other in the direction of the longitudinal axis of the pickup body.

11. The transport system according to claim 1, wherein the locking unit has two locking elements pretensioned in the direction towards the locked position.

12. The transport system according to claim 1, wherein the locking elements are spring-pretensioned.

13. The transport system according to claim 9, wherein the guide is a dovetail guide.

14. A transport system for motor vehicle engines, with
an engine unit arrangeable on a motor vehicle engine to be transported and
a load pickup unit arrangeable on a load carrier, wherein
a locking unit adjustable between a locked position and an unlocked position is arranged on the load pickup unit, which is designed such that it automatically locks the engine unit in response to a motor vehicle engine being arranged on the load pickup unit in a transport position;
wherein the locking unit has at least one locking elements pretensioned, in a direction towards the locked position;
wherein the at least one locking elements have two detent projections arranged at a distance from each other, which are located in engagement with correspondingly designed detent bodies on the engine unit in the transport position of the engine unit;
wherein the load pickup unit has a pickup body and the engine unit has a pickup opening adjusted to the pickup body such that the engine unit in the transport position is fixed mainly perpendicular to a longitudinal axis of the pickup body on the load pickup unit;
wherein the pickup opening and the pickup body have two correspondingly designed cylinder sections arranged at a distance from each other in a direction of the longitudinal axis of the pickup body;
wherein the load pickup unit and the engine unit are fixed against each other in the transport position via an anti-twist device;
wherein the cylinder sections are interconnected via a conical connection section, wherein the cylinder section facing the engine unit has a smaller diameter than the cylinder section facing away from the engine unit;
wherein the locking unit has at least one locking elements pretensioned, in a direction towards the locked position;
wherein the at least one locking elements have play compensation means;
wherein the at least one locking elements have two detent projections arranged at a distance from each other, which are located in engagement with correspondingly designed detent bodies on the engine unit in the transport position of the engine unit; and
wherein the play compensation means has a threaded bolt extending through a through hole of the at least one locking elements having an elongated cross-section and fixed on the load pickup unit.

15. A transport system for motor vehicle engines, with
an engine unit arrangeable on a motor vehicle engine to be transported and
a load pickup unit arrangeable on a load carrier, wherein
a locking unit adjustable between a locked position and an unlocked position is arranged on the load pickup unit, which is designed such that it automatically locks the engine unit in response to a motor vehicle engine being arranged on the load pickup unit in a transport position;
wherein the locking unit has at least one locking elements pretensioned, in a direction towards the locked position;
wherein the at least one locking elements have two detent projections arranged at a distance from each other, which are located in engagement with correspondingly designed detent bodies on the engine unit in the transport position of the engine unit;
wherein the load pickup unit has a pickup body and the engine unit has a pickup opening adjusted to the pickup body such that the engine unit in the transport position is fixed mainly perpendicular to a longitudinal axis of the pickup body on the load pickup unit;

wherein the pickup opening and the pickup body have two correspondingly designed cylinder sections arranged at a distance from each other in a direction of the longitudinal axis of the pickup body;

wherein the load pickup unit and the engine unit are fixed against each other in the transport position via an anti-twist device;

wherein the cylinder sections are interconnected via a conical connection section, wherein the cylinder section facing the engine unit has a smaller diameter than the cylinder section facing away from the engine unit;

wherein the locking unit has at least one locking elements pretensioned, in a direction towards the locked position;

wherein the at least one locking elements have play compensation means;

wherein the at least one locking elements have two detent projections arranged at a distance from each other, which are located in engagement with correspondingly designed detent bodies on the engine unit in the transport position of the engine unit;

wherein the play compensation means has a threaded bolt extending through a through hole of the at least one locking elements having an elongated cross-section and fixed on the load pickup unit; and wherein the at least one locking element has an infeed plane.

* * * * *